(12) United States Patent  
Wang et al.

(10) Patent No.: US 12,633,764 B2  
(45) Date of Patent: May 19, 2026

(54) POWER SUPPLY CONTROL METHOD AND ELECTRONIC DEVICE

(71) Applicant: Honor Device Co., Ltd., Shenzhen (CN)

(72) Inventors: Huiwen Wang, Shenzhen (CN); Yulei Wen, Shenzhen (CN); Wei Tong, Shenzhen (CN); Feng Yu, Shenzhen (CN)

(73) Assignee: HONOR DEVICE CO., LTD., Shenzhen (CN)

( * ) Notice: Subject to any disclaimer, the term of this patent is extended or adjusted under 35 U.S.C. 154(b) by 0 days.

(21) Appl. No.: 18/849,926

(22) PCT Filed: Apr. 26, 2023

(86) PCT No.: PCT/CN2023/091008  
§ 371 (c)(1),  
(2) Date: Sep. 23, 2024

(87) PCT Pub. No.: WO2024/016773  
PCT Pub. Date: Jan. 25, 2024

(65) Prior Publication Data  
US 2025/0323514 A1 Oct. 16, 2025

(30) Foreign Application Priority Data

Jul. 20, 2022 (CN) .......................... 202210853401.6

(51) Int. Cl.  
*H02J 7/00* (2026.01)

(52) U.S. Cl.  
CPC .... *H02J 7/00308* (2020.01); *H02J 7/007182* (2020.01); *H02J 7/0068* (2013.01); *H02J 2207/20* (2020.01)

(58) Field of Classification Search  
CPC ............ H02J 7/00308; H02J 7/007182; H02J 7/0068; H02J 2207/20  
USPC .......................................................... 307/19  
See application file for complete search history.

(56) References Cited

U.S. PATENT DOCUMENTS

| | | | |
|---|---|---|---|
| 2009/0001935 A1 | 1/2009 | Odaohhara | |
| 2011/0205678 A1 | 8/2011 | Baba et al. | |
| 2020/0067335 A1 | 2/2020 | Lim et al. | |
| 2020/0389041 A1* | 12/2020 | Li ........................ H02J 7/0016 | |
| 2022/0045526 A1 | 2/2022 | Hoyt | |

FOREIGN PATENT DOCUMENTS

| | | | |
|---|---|---|---|
| CN | 103000962 A | | 3/2013 |
| CN | 107171373 | * | 9/2017 |
| CN | 107171373 A | | 9/2017 |

(Continued)

*Primary Examiner* — Daniel Cavallari  
*Assistant Examiner* — Xuan Ly  
(74) *Attorney, Agent, or Firm* — Slater Matsil, LLP

(57) ABSTRACT

A first overvoltage protection OVP threshold is set for the electronic device, and when a voltage of a battery is greater than the first OVP threshold, a power supply module is controlled not to supply power to a load; the power supply module is controlled not to charge a battery in a battery module; and the battery in the battery module is controlled to supply power to the load until the voltage of the battery is always less than a second OVP threshold in preset duration, where the second OVP threshold is less than the first OVP threshold.

20 Claims, 10 Drawing Sheets

(56)         References Cited

FOREIGN PATENT DOCUMENTS

CN        109802457  A       5/2019
CN        110758127  A       2/2020
CN        110854816  A       2/2020
CN        111049229     *    4/2020
CN        111049229  A       4/2020
CN        112054477  A      12/2020
CN        113009995  A       6/2021
CN        114665562  A       6/2022

* cited by examiner

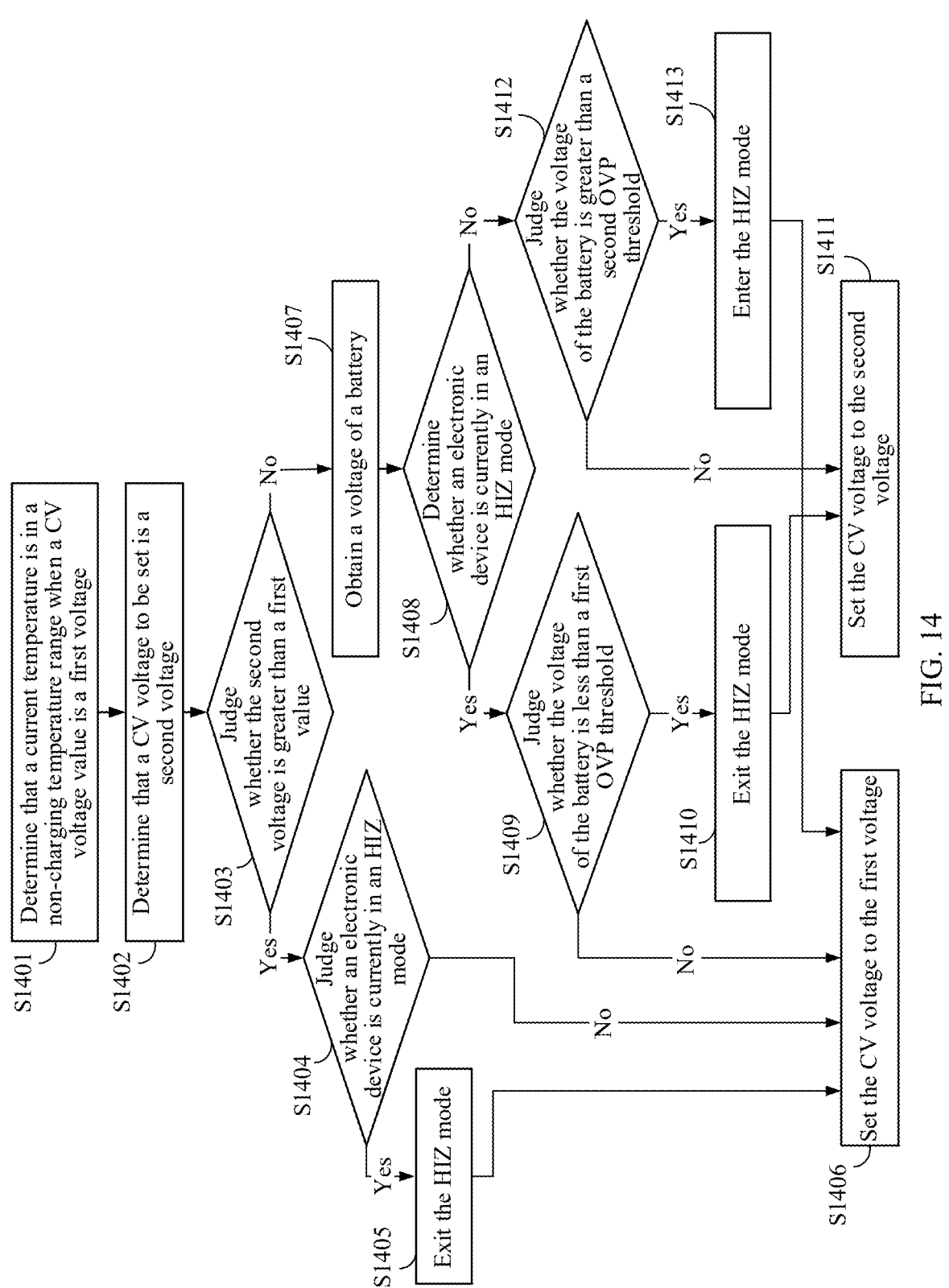

S1401  Determine that a current temperature is in a non-charging temperature range when a CV voltage value is a first voltage S1402  Determine that a CV voltage to be set is a second voltage S1403  Judge whether the second voltage is greater than a first value S1404  Judge whether an electronic device is currently in an HIZ mode S1405  Exit the HIZ mode S1406  Set the CV voltage to the first voltage S1407  Obtain a voltage of a battery S1408  Determine whether an electronic device is currently in an HIZ mode S1409  Judge whether the voltage of the battery is less than a first OVP threshold S1410  Exit the HIZ mode S1411  Set the CV voltage to the second voltage S1412  Judge whether the voltage of the battery is greater than a second OVP threshold S1413  Enter the HIZ mode

FIG. 14

POWER SUPPLY CONTROL METHOD AND ELECTRONIC DEVICE

CROSS-REFERENCE TO RELATED APPLICATIONS

This application is a national stage of International Application No. PCT/CN2023/091008, filed on Apr. 26, 2023, which claims priority to Chinese Patent Application No. 202210853401.6, filed on Jul. 20, 2022. The disclosures of both of the aforementioned applications are hereby incorporated by reference in their entireties.

TECHNICAL FIELD

Embodiments of this application relate to the field of electronic devices, and in particular, to a power supply control method and an electronic device.

BACKGROUND

An overvoltage protection strategy for a battery may be set in an electronic device, to control the battery to supply power to a load when a voltage of the battery is excessively high, to achieve discharge and voltage release of the battery. However, in the current overvoltage protection strategy, a problem of reduction in a transient power supply voltage for the load may occur.

In view of this, it is necessary to avoid the reduction in the transient power supply voltage while providing effective overvoltage protection for the battery, to improve running stability of the load.

SUMMARY

Embodiments of this application provide a power supply control method and an electronic device, which relate to the field of electronic devices, to effectively protect a battery from overvoltage, and avoid power supply oscillation caused by triggering OVP protection.

To achieve the foregoing objective, the following technical solutions are used in embodiments of this application:

According to a first aspect, a power supply control method is provided. The method is applied to an electronic device. A power supply module, a battery module, and a load are arranged in the electronic device. An input end of the power supply module is coupled to an external power supply, to receive an external current. An output end of the power supply module is coupled to the battery module and the load respectively, to charge a battery in the battery module and/or supply power to the load. The battery module is coupled to the load at a first end, and the battery module is configured to supply power to the load through the first end. A first overvoltage protection OVP threshold is set for the electronic device, and when a voltage of the battery is greater than the first OVP threshold, the method includes: controlling the power supply module not to supply power to the load; controlling the power supply module not to charge the battery in the battery module; and controlling the battery in the battery module to supply power to the load until the voltage of the battery is always less than a second OVP threshold in preset duration, where the second OVP threshold is less than the first OVP threshold.

It should be understood that OVP protection is triggered when the voltage of the battery is greater than the first OVP threshold, causing power supply oscillation. In this application, before the OVP protection is triggered, effective discharge and voltage release may be performed by controlling the battery. When it is judged based on native logic whether the voltage of the battery is excessively high to trigger the OVP protection, because the voltage of the battery has been reduced, the OVP protection is not triggered. In this way, corresponding power supply oscillation is avoided. For example, in the native logic, the electronic device may modify a CV value when entering an abnormal environment (for example, there is a significant change in a temperature), and a corresponding OVP threshold changes. Therefore, the solution in this example may be applied before the CV value is modified. In this way, the OVP protection is not triggered even if the OVP threshold changes due to modification on the CV value. It should be noted that in this example, the OVP protection is triggered when the voltage of the battery is greater than the first OVP threshold. In some other embodiments of this application, even if the voltage of the battery is not greater than the first OVP, for example, when the electronic device determines that there is a significant change in the temperature (for example, the temperature enters a non-charging temperature range), the power supply module may also be controlled not to supply power to the load and not to supply power to the battery, and the battery may also be controlled to supply power to the load to discharge and release voltage. In this way, the voltage of the battery can be effectively reduced before the CV value is modified, to avoid the triggering of the OVP protection, thereby avoiding resulting power supply oscillation.

Optionally, the first OVP threshold is determined by the electronic device based on a first constant voltage CV voltage set in advance, the second OVP threshold is determined by the electronic device based on a second CV voltage, and the second CV voltage is less than the first CV voltage. This example defines how the OVP threshold is set. For example, the OVP threshold may not be set directly but through the CV voltage.

Optionally, before the controlling the power supply module not to supply power to the load, the CV voltage in the electronic device is the first CV voltage. When the power supply module charges the battery, the method further includes: when the electronic device determines that a current temperature is in the non-charging temperature range, adjusting the CV voltage to the second CV voltage for triggering the overvoltage protection for the battery. The current temperature is a current battery temperature, or an ambient temperature of the electronic device. In this way, an application scenario of this solution is defined, for example, the temperature change is the non-charging temperature range.

Optionally, the charging temperature range is in a range of 0 degrees Celsius to 50 degrees Celsius, and the non-charging temperature range is in a range less than 0 degrees Celsius and greater than 50 degrees Celsius. In this way, a specific temperature interval of the non-charging temperature range is defined.

Optionally, the power supply module supplies power to the load before the electronic device is triggered to perform overvoltage protection on the battery. It should be understood that this solution may be applied to sudden temperature changes during charging, to reduce the voltage of the battery before the CV voltage is reset, thereby avoiding triggering of the OVP protection after the CV voltage is reset.

Optionally, after the controlling the battery in the battery module to supply power to the load until the voltage of the battery is always less than a second OVP threshold in preset duration, the method further includes: controlling the power supply module to supply power to the load. In this way, after it is determined that the voltage of the battery is effectively reduced, and the OVP protection is not triggered, original power supply logic may be restored, for example, the external current is connected to the power supply module to supply power to the load. This also avoids an excessive loss of electrical energy of the battery.

Optionally, the power supply module includes a first switching unit and a second switching unit, an operating status of the first switching unit or the second switching unit includes a switch-on state and a switch-off state, and the power supply module further includes a power supply control unit, where the power supply control unit is configured to control operating statuses of the first switching unit and the second switching unit through control ends of the first switching unit and the second switching unit. The controlling the power supply module not to supply power to the load and the controlling the power supply module not to charge the battery in the battery module include: controlling, by the power supply control unit, the first switch and the second switching unit to operate in the switch-off state. In this example, a function of the power supply module may be implemented through the switching unit. For example, the switching unit may be a MOS transistor, a diode, or the like.

Optionally, the battery module includes the battery and a third switching unit, where the third switching unit is arranged between the battery and the first end. A control end of the third switching unit is coupled to the power supply control unit. The third switching unit operates in the switch-on state or the switch-off state under control of the power supply control unit. The controlling the battery in the battery module to supply power to the load includes: controlling, by the power supply control unit, the third switching unit to operate in the switch-on state.

Optionally, after the controlling the battery in the battery module to supply power to the load until the voltage of the battery is always less than a second OVP threshold in preset duration, the method further includes: controlling, by the power supply control unit, the first switching unit and the second switching unit to operate in the switch-on state, to facilitate the power supply module to supply power to the load.

Optionally, the first switching unit, the second switching unit, and the third switching unit are MOS transistors.

Optionally, the first switching unit and the second switching unit form a Buck circuit.

Optionally, the power supply module is a Charger IC. It should be noted that in some implementations, as shown in this example, the power supply module may be the Charger IC, that is, the Buck circuit may be integrated in the power supply module. In some other embodiments, the Buck circuit may be arranged independent of the Charger IC.

According to a second aspect, a power supply apparatus is provided. The power supply apparatus has functions of implementing behaviors of the electronic device in the method according to the first aspect. These functions may be implemented by hardware, or may be implemented by hardware by executing corresponding software. The hardware or the software includes one or more modules corresponding to the foregoing functions, for example, a control unit or module, a detection unit or module, a judgment unit or module, and an acquisition unit or module.

According to a third aspect, an electronic device is provided. The electronic device includes one or more processors and one or more memories. The one or more memories are coupled to the one or more processors, and the one or more memories store computer instructions. When the one or more processors execute the computer instructions, the electronic device is enabled to perform the power supply control method according to the first aspect and possible designs thereof.

According to a fourth aspect, a computer-readable storage medium is provided, including computer instructions. When the computer instructions are run on an electronic device, the electronic device is enabled to perform the power supply control method according to the first aspect and possible designs thereof.

According to a fifth aspect, a chip system is provided, where the chip system includes an interface circuit and a processor. The interface circuit and the processor are interconnected by using a line. The interface circuit is configured to receive a signal from a memory and send the signal to the processor. The signal includes computer instructions stored in the memory. When the processor executes the computer instructions, the chip system performs the power supply control method according to the first aspect and possible designs thereof.

It may be understood that the solutions provided in the second aspect, the third aspect, the fourth aspect, and the fifth aspect are all used to perform the method according to the first aspect and possible designs thereof. Therefore, for beneficial effects that can be achieved, reference may be made to beneficial effects in the corresponding method provided above, and details are not described herein again.

BRIEF DESCRIPTION OF THE DRAWINGS

FIG. 14 is a schematic flowchart of still another power supply control method according to an embodiment of this application;

DETAILED DESCRIPTION OF ILLUSTRATIVE EMBODIMENTS

Figure 1:
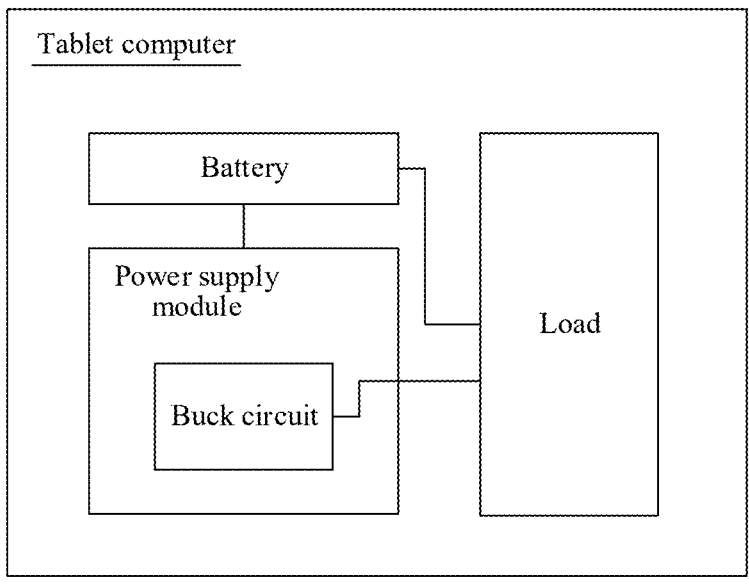
FIG. 1 is a schematic diagram of logic of composition of a power supply system.

During operation, each load (for example, a system component) in an electronic device may require a battery of the electronic device and/or an external power supply to provide a current to the load. For example, the electronic device is a tablet computer. FIG. 1 is a schematic diagram of logic of power supply-related parts in the tablet computer.

As shown in FIG. 1, a battery (or a battery pack) may be arranged in the tablet computer. When electrical energy is stored in the battery, the battery may supply power to the load. A power supply module may also be arranged in the tablet computer, and the power supply module may be configured to manage a power supply strategy of the electronic device. For example, when the tablet computer is connected to an external power supply, the power supply module may be configured to control the external power supply to charge the battery. In another example, the power supply module may be configured to control a Buck circuit in the power supply module to supply power to the load through the external power supply, and the like. In another example, the power supply module may be configured to control the battery to supply power to the load, and the like.

The external power supply of the tablet computer may be input from a power supply interface arranged on the tablet computer.

Figure 2:
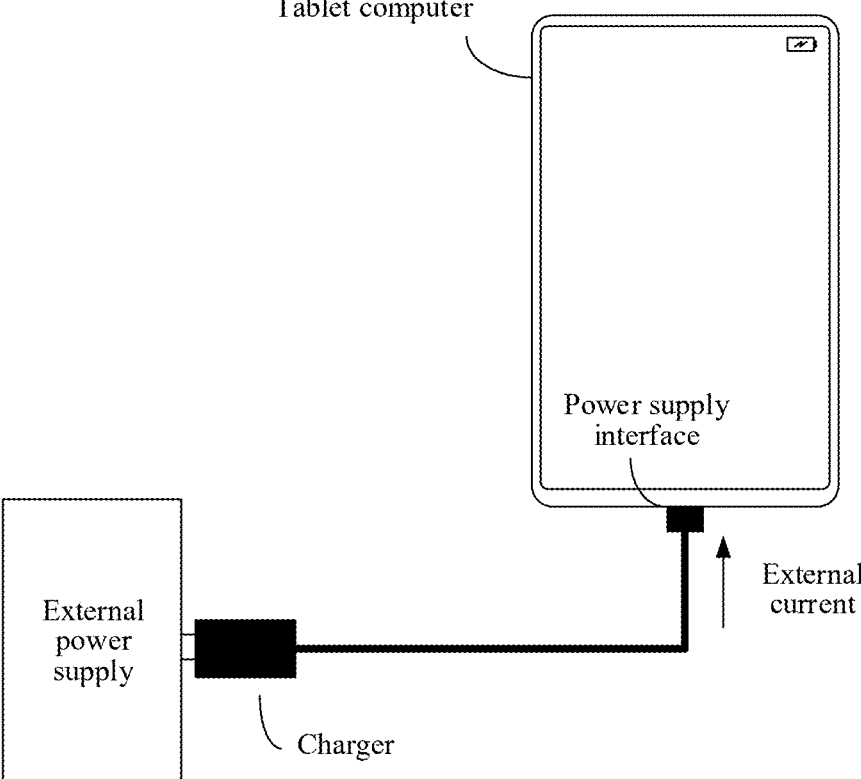
FIG. 2 is a schematic diagram of a charging scenario.

For example, referring to FIG. 2, a universal serial bus (universal serial bus, USB) interface may be arranged on the tablet computer. In this example, when one end of a charger is connected to the external power supply and the other end of the charger is coupled to the USB interface, the USB interface may be as a power supply interface of the tablet computer to be connected to the external power supply. In this way, the external power supply may output a current (for example, which is referred to as an external current), and the external current is input to the tablet computer after being processed by the charger.

Figure 3:
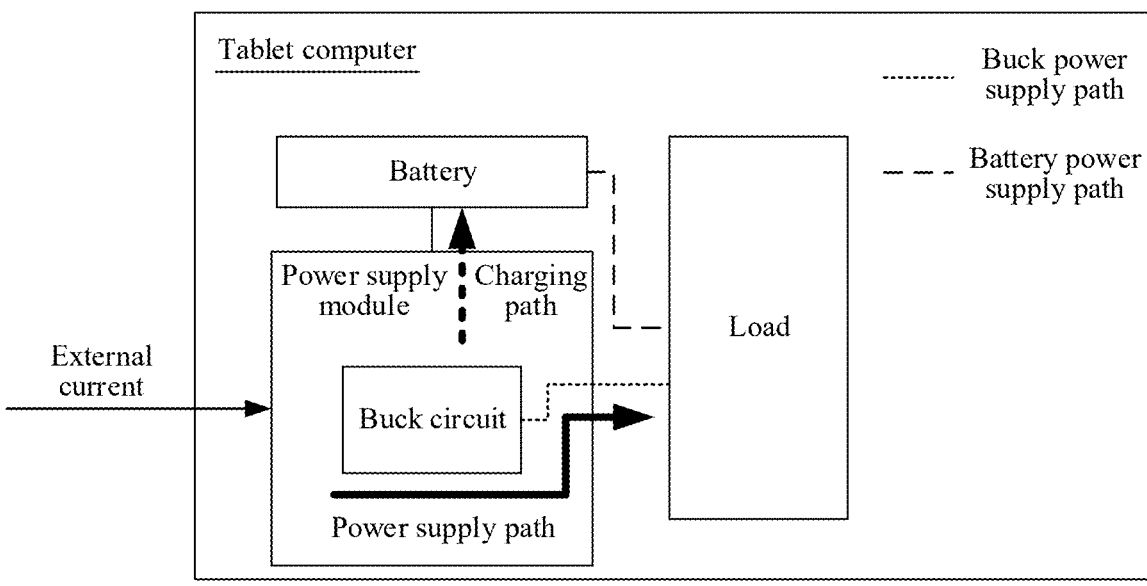
FIG. 3 is a schematic diagram of internal logic of power supply and charging.

Referring to FIG. 3 with reference to the description in FIG. 1, when there is an external current input to the tablet computer, the external current may be input to the power supply module of the tablet computer. An example in which the external current is used to charge the battery is used. Then, the power supply module may introduce the current into the battery through a charging path shown in FIG. 3, thereby charging the tablet computer.

An example in which the external current is used to supply power to the load is used. The power supply module may supply power to the load by outputting the current to the load through a power supply path shown in FIG. 3.

It should be noted that, as shown in FIG. 1, the battery may further be configured to supply power to the load. Then, in the example shown in FIG. 3, a battery power supply path may also be arranged between the battery and the load. Generally, when the battery is charged, the battery power supply path may be in a non-operating state, and the external current is correspondingly used to supply power to the load. In this way, the battery is prevented from supplying power to the load while being charged, to protect the battery.

Currently, an overvoltage protection (overvoltage protection, OVP) strategy for the battery is set for most electronic devices, to avoid damage to the battery caused by an excessively high voltage of the battery.

Figure 4:
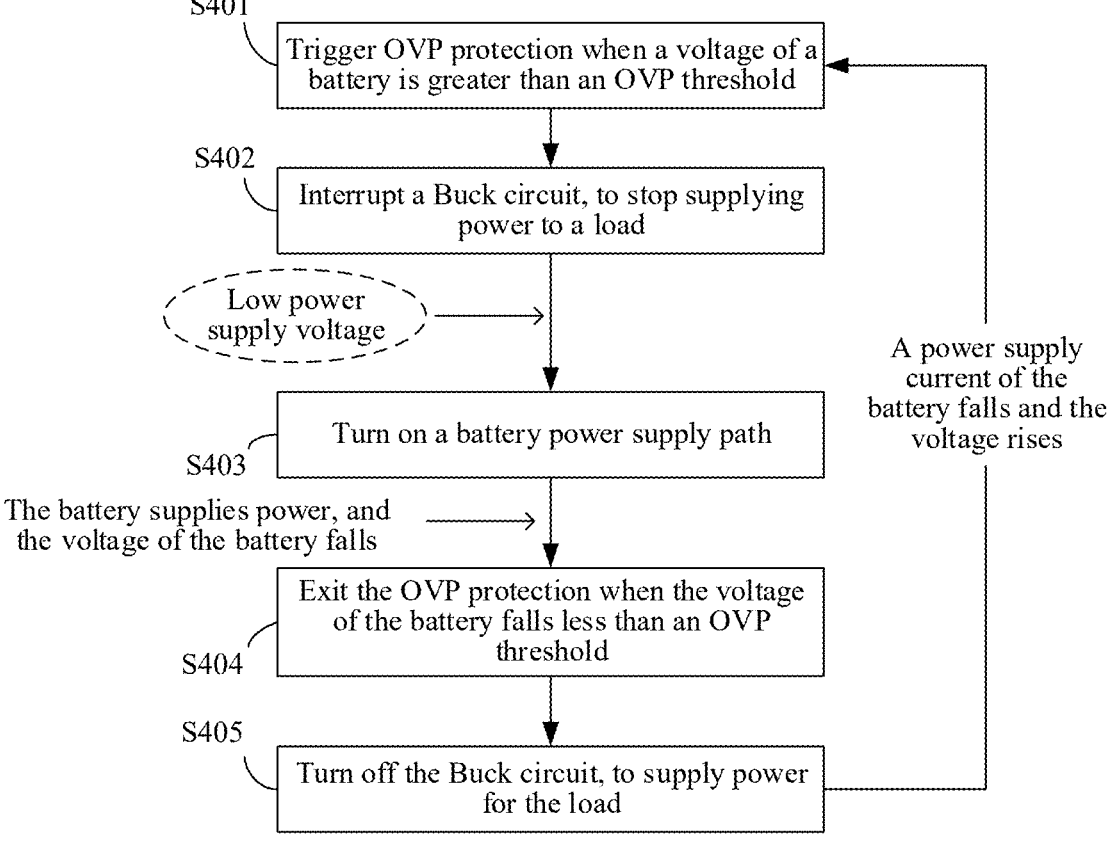
FIG. 4 is a schematic flowchart of overvoltage protection.

For example, FIG. 4 is a schematic diagram of execution logic of an OVP strategy. The solution shown in FIG. 4 may be set in the power supply module, or may be set in a module that can be directly or indirectly read by another power supply module of the electronic device, to facilitate the power supply module to implement the overvoltage protection for the battery by using this OVP strategy. This solution may include:

S401. Trigger OVP protection when a voltage of a battery is greater than an OVP threshold.

The OVP threshold may be a voltage that triggers the OVP protection. When the voltage of the battery is excessively high, for example, the voltage of the battery is greater than the OVP threshold, it is considered that the battery may be at a risk of overvoltage.

Generally, a process of charging an electronic device is used as an example. The charging process may include a trickle charge stage, a constant current charge stage, a constant voltage charge stage, and a charge termination stage. When a power level of the electronic device is close to a full power level, the charging process may be switched from the constant current charge stage to the constant voltage charge stage. The voltage of the battery in the constant voltage charge stage may be referred to as a constant voltage (Constant Voltage, CV) voltage. In some cases, the CV voltage may be preset in the electronic device based on an actual situation of the electronic device. In different cases, the CV voltage may also be flexibly adjusted by the electronic device based on a current state.

In this example, the OVP threshold may be calculated based on a functional relationship between a preset OVP threshold and the CV voltage. In other words, when the CV voltage needs to be adjusted, the OVP threshold is also adjusted dynamically following the CV voltage.

In this example, the power supply module may detect the voltage of the battery in real time, and when the voltage of the battery is greater than a current OVP threshold, the OVP protection is triggered, and the following S402 is performed.

It should be noted that, in different implementations, the OVP threshold may be a voltage value, or may be a voltage interval. When the OVP threshold is a voltage interval, the voltage of the battery is greater than a maximum value (that is, an upper voltage limit) of the voltage interval, it is considered that the voltage of the battery is greater than the OVP threshold, the OVP protection is correspondingly triggered, and the following S402 is performed.

S402. Interrupt the Buck circuit, to stop supplying power to the load.

With reference to the description in FIG. 3, an example in which the battery is being charged is used, the power supply module may control an external current, and perform processing such as rectifying, transforming, and the like on the external current through the Buck circuit, to obtain a power supply current corresponding to the load. The power supply current may be transmitted to the load, to supply power to the load.

Based on this example, after the OVP protection is triggered, the power supply module may interrupt the Buck circuit, so that the external current does not flow to the load through the Buck circuit.

It should be understood that the electronic device uses only the Buck circuit to supply power to the load before the Buck circuit is interrupted. After S402 is performed, the Buck circuit no longer supplies power to the load, and a transient power supply voltage may drop.

To ensure normal operation of the load, the power supply module in the electronic device may detect a power supply voltage of the load in real time. When the transient power supply voltage drops, the power supply module may continue to supply power to the load by using another power supply. For example, S403 is performed.

S403. Establish a battery power supply path. Therefore, the battery is used to continue to supply power to the load.

After the battery supplies power to the load, the voltage of the battery drops. In this way, an effect of providing the overvoltage protection to the battery is achieved. As the voltage of the battery continuously drops, the power supply module may control to exit current OVP protection and start to normally supply power to the load. For example, the power supply module may perform the following S404 and S405.

S404. Exit the OVP protection when the voltage of the battery drops below the OVP threshold.

S405. Establish the Buck circuit, to start to supply power to the load.

In this way, after S405 is performed, a power supply state of the electronic device may be restored to a state before the OVP protection is triggered, for example, the external current is used to supply power to the electronic device through the Buck circuit. Based on processing in S401 to S405, the voltage of the battery is enabled to drop below the OVP threshold, thereby avoiding the risk of overvoltage.

It should be noted that, in an actual use process of the electronic device, the voltage of the battery may be greater than the OVP threshold due to various reasons, to trigger to perform S401.

For example, when there is an abnormal change in a temperature, the OVP protection may be triggered to protect the battery.

An example in which the electronic device is being charged is used. To ensure normal charging on the battery, the battery may be charged by using the charging path shown in FIG. 3 when the electronic device determines that a current temperature (for example, a battery temperature, an ambient temperature, or the like) is in a charging temperature range. For example, a temperature 1 may be in the charging temperature range. When the current temperature is the temperature 1, the power supply module may use the external current to charge the battery through the charging path. In some embodiments, the charging temperature range may be in a range of 0 degrees Celsius to 45 degrees Celsius. In some other embodiments, the charging temperature range may be in a range of 0 degrees Celsius to 50 degrees Celsius.

Figure 5:
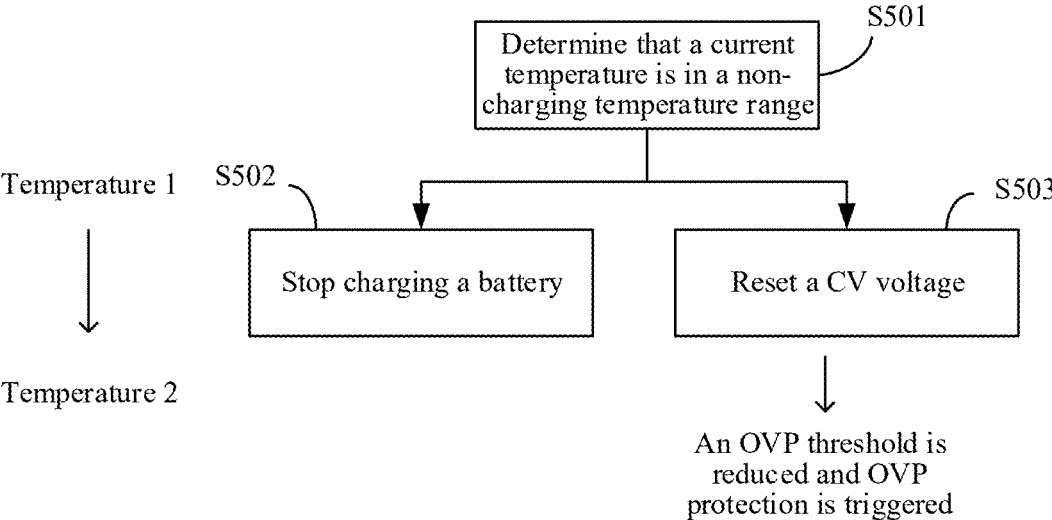
FIG. 5 is a schematic diagram of triggering overvoltage protection.

The power supply module may limit the charging on the battery when the current temperature changes from the temperature 1 to a temperature 2, and the temperature 2 is not in the charging temperature range. For example, the current temperature is low, which is close to 0 degrees Celsius. At a moment when the current temperature is less than 0 degrees Celsius, a scenario in which the temperature 1 changes to the temperature 2 occurs. As shown in FIG. 5, the power supply module may determine that the current temperature is in a non-charging temperature range (that is, S501 is performed). Correspondingly, the power supply module may perform S502 and S503. S502. Stop charging the battery. S503. Reset the CV voltage.

It should be understood that a capability of the battery to withstand a maximum voltage may also be affected when the current temperature is not in the charging temperature range. In an example in FIG. 5, dynamic adjustment of the OVP threshold may be implemented by resetting the CV voltage. For example, the resetting the CV voltage may be to reduce the CV voltage. The OVP threshold is decreased correspondingly. Therefore, an overvoltage protection mechanism shown in FIG. 4 is triggered when the voltage of the battery is relatively high (for example, when the battery is about to be fully charged or is already full charged). In this way, the electronic device may be enabled to trigger the OVP protection earlier in an abnormal environment (for example, the current temperature is not in the charging temperature range), to perform overvoltage protection on the battery.

However, some problems may occur in the current overvoltage protection strategy. For example, still refer to FIG. 4. After S402, because the Buck circuit is interrupted, transient reduction in the power supply voltage provided to the load occurs. In addition, the voltage supplied for the load is always in an undervoltage state until the voltage supplied by the battery for the load is restored to the power supply voltage required by the load. This may cause damage to some components in the load that are sensitive to the voltage.

In addition, as shown in FIG. 4, after power is supplied to the battery and the voltage of the battery drops to the OVP threshold, S405 is performed to restore power supply to the Buck circuit. In this way, regardless of whether the battery continues to supply power, a current on the battery power supply path is significantly reduced. It should be understood that in a process of triggering the OVP protection shown in FIG. 4, the battery only discharges for a short period of time, and electrical energy in the battery does not drop significantly. When power supply to the Buck circuit causes the current on the battery power supply path to drop, the voltage of the battery rises again. Therefore, the voltage of the battery may be greater than the OVP threshold, and the OVP protection may be cyclically triggered. This cycle may be performed for a plurality of times and cannot exit until the battery discharges for a plurality of times and the voltage of the battery is not greater than the OVP threshold even after using the Buck circuit to supply power. In this way, when the OVP protection procedure is executed for a plurality of times, the transient reduction in the power supply voltage the load between S402 to S403 repeatedly occurs, resulting in greater impact on the load.

In the following description, this case in which the power supply voltage drops for a plurality of times is referred to as power supply oscillation. Apparently, the power supply oscillation may have significant impact on normal operation of the load. Therefore, it is necessary to avoid the power supply oscillation as much as possible while providing the overvoltage protection for the battery.

To resolve the foregoing technical problem, embodiments of this application provide a power supply control method, which can avoid the risk of overvoltage of the battery by discharging and releasing the voltage of the battery in advance, and avoid triggering of the OVP protection, thereby avoiding the power supply oscillation.

The following describes implementations in embodiments of this application in detail with reference to the accompanying drawings.

For example, the solution described in embodiments of this application may be applied to an electronic device. The electronic device may be a device such as a mobile phone, a tablet computer, a desktop computer, a laptop computer, a handheld computer, a notebook computer, an ultra-mobile personal computer (ultra-mobile personal computer, UMPC), a netbook, a cellular phone, a personal digital assistant (personal digital assistant, PDA), an augmented reality (augmented reality, AR)/virtual reality (virtual reality, VR) device, or a media player. A specific form of the device is not specifically limited in embodiments of this application.

Figure 6:
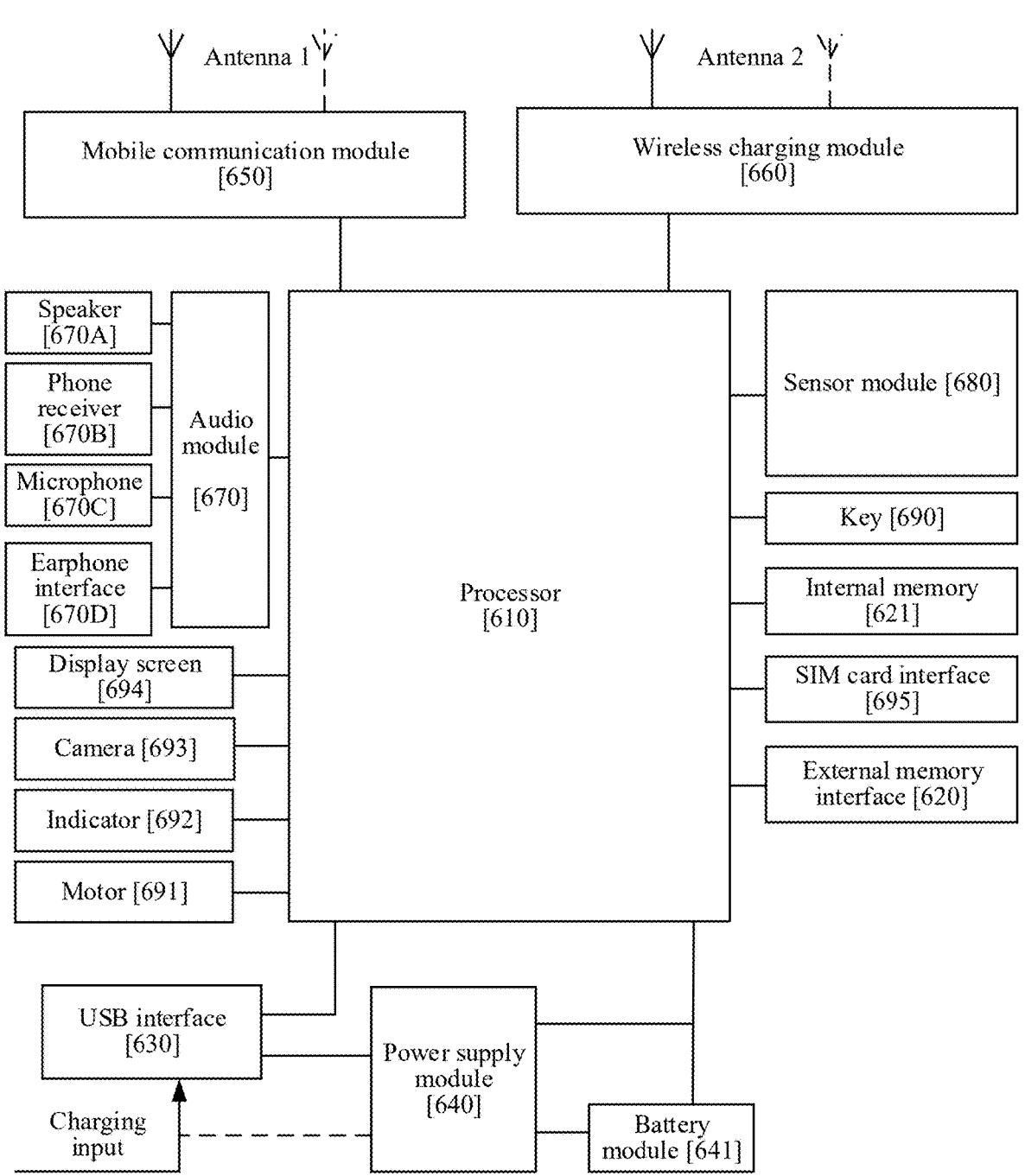
FIG. 6 is a schematic diagram of composition of an electronic device according to an embodiment of this application.

FIG. 6 is a schematic diagram of composition of an electronic device according to an embodiment of this application. As shown in FIG. 6, the electronic device may include a processor 610, an external memory interface 620, an internal memory 621, a USB interface 630, a power supply module 640, a battery module 641, an antenna 1, an antenna 2, a mobile communication module 650, a wireless communication module 660, an audio module 670, a speaker 670A, a phone receiver 670B, a microphone 670C, an earphone interface 670D, a sensor module 680, a key 690, a motor 691, an indicator 692, a camera 693, a display screen 694, a subscriber identification module (subscriber identification module, SIM) card interface 695, and the like. The sensor module 680 may include a pressure sensor, a gyro sensor, a barometric pressure sensor, a magnetic sensor, an acceleration sensor, a distance sensor, an optical proximity sensor, a fingerprint sensor, a temperature sensor, a touch sensor, an ambient light sensor, a bone conduction sensor, and the like.

It should be noted that in embodiments of this application, a set of components that need to be driven by using electrical energy other than the power supply module 640 and the battery module 641 in the electronic device may be referred to as a system unit, a system component, or a load.

The structure shown in this embodiment does not constitute a specific limitation on the electronic device. In some other embodiments, the electronic device may include more or fewer components than those shown in FIG. 6, or some components are combined, or some components are split, or components are arranged in different manners. The components shown in FIG. 6 may be implemented by hardware, software, or a combination of software and hardware.

In an example in FIG. 6, the processor 610 may include one or more processing units. For example, the processor 610 may include an application processor (application processor, AP), a modem processor, a graphics processing unit (graphics processing unit, GPU), an image signal processor (image signal processor, ISP), a controller, a memory, a video codec, a digital signal processor (digital signal processor, DSP), a baseband processor, and/or a neural-network processing unit (neural-network processing unit, NPU). Different processing units may be independent components, or may be integrated into one or more processors.

The following describes the composition of the power supply module 640 shown in FIG. 6 by using an example.

In this embodiment of this application, the power supply module 640 may be configured to control a power supply strategy of the electronic device. In some embodiments, a function of the power supply module 640 may be implemented through a charger integrated circuit (charger Integrated Circuit, charger IC).

For example, in some embodiments, the power supply module 640 may receive an external current from the USB interface 630 and control the external current to charge a battery in the battery module 642. In some other embodiments, the power supply module 640 may receive an external current from the USB interface 630 and supply power to the load through a Buck circuit arranged in the power supply module 640. In some other embodiments, the power supply module 640 may control a battery in the battery module 642 to supply power to the load. In the example in FIG. 6, an example in which the external current is received through the USB interface 630 is used. In some other implementations of this application, the external current may also be connected through a wireless charging mechanism. For example, a charging coil is arranged in the electronic device and is configured to obtain energy through electromagnetic coupling when the charging coil is close to a transmitting end coil of a wireless charger, convert the obtained energy into an external current, and input the external current into the electronic device.

Figures 7, 8:
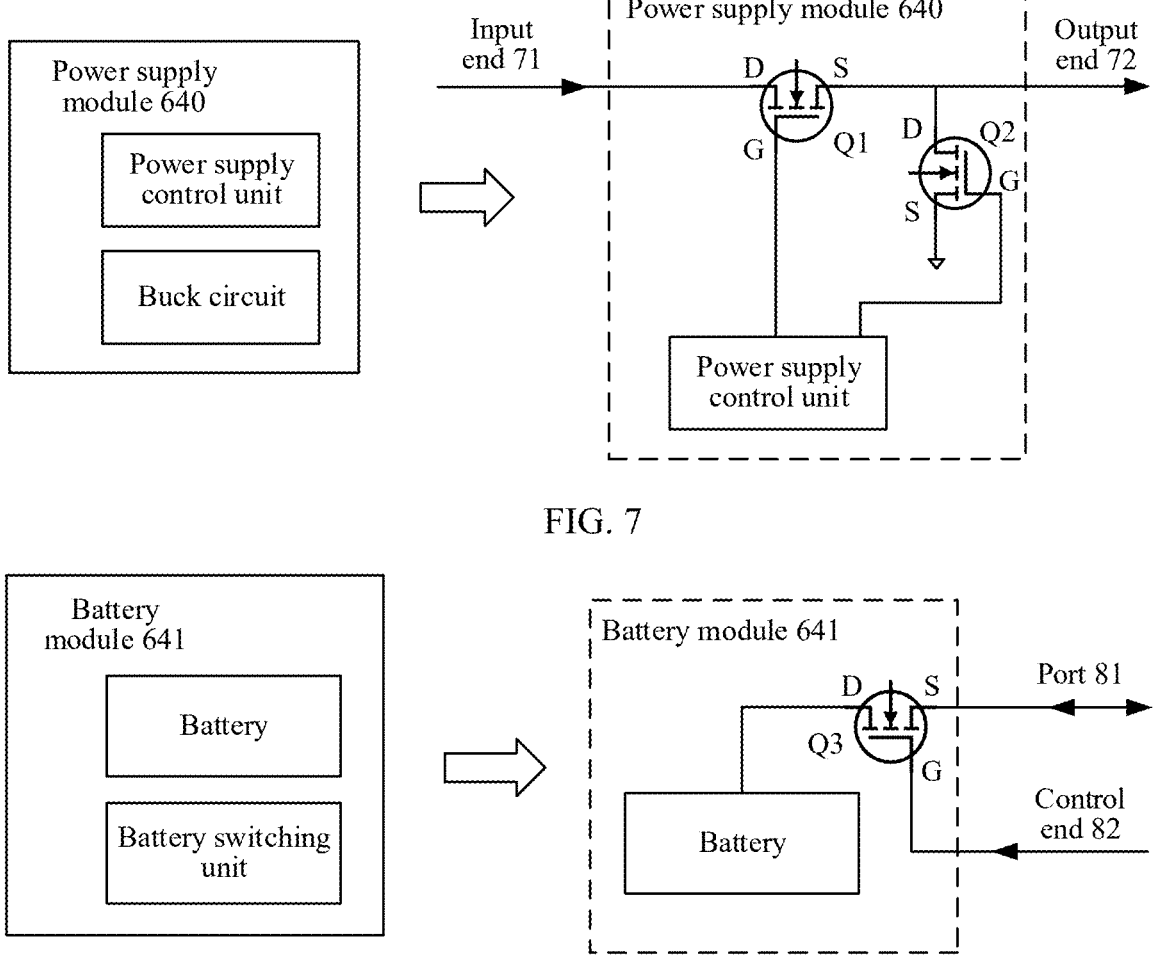
FIG. 7 is a schematic diagram of composition of a power supply module according to an embodiment of this application.
FIG. 8 is a schematic diagram of composition of a battery module according to an embodiment of this application.

As an implementation, referring to FIG. 7, the power supply module 640 may include a power supply control unit for power supply control and a Buck circuit. It should be noted that, in this example, an example in which the power supply control unit and the Buck circuit are arranged separately is used. In some other implementations, the Buck circuit may also be integrated into the power supply control unit and arranged in the electronic device as an integral component. The effects that they can achieve are similar and details are not described herein again.

The power supply control unit may control an operating state of the Buck circuit and the battery module 641, to implement power supply from the external current to the load through the Buck circuit, charging on the external current to the battery module 641, power supply of the battery module 641 for the load, and the like.

The Buck circuit may include at least two field-effect transistors (MOS transistors). For example, a MOS transistor Q1 and a MOS transistor Q2 may be arranged in the Buck circuit. In an example in FIG. 7, an example in which Q1 and Q2 are N-type MOS transistors is used. In some other implementations, Q1 and/or Q2 may be other types of MOS transistors, for example, P-shaped MOS transistors, or Q1 and/or Q2 may be other electronic switching components such as triodes.

As shown in FIG. 7, a drain (Drain, D) pole of Q1 may be used as an input end 71 of the power supply module 640, to receive an external current. A source (Source, S) pole of Q1 is coupled to a D pole of Q2, a gate (Gate, G) pole of Q1 is coupled to the power supply control unit, an S pole of Q2 is grounded, and a G pole of Q2 is coupled to the power supply control unit. The S pole of Q1 and the D pole of Q2 may correspond to an output end 72 of the power supply module 640, to output a current to the outside (for example, the battery and/or the load).

The Buck circuit may work in different states in different cases. For example, the different states may include a conduction state and an interruption state. In the different states, switch-on/switch-off states of Q1 and/or Q2 are not exactly the same. The switch-on/switch-off state of Q1 and Q2 may be implemented by controlling the power supply control unit.

It should be noted that in this embodiment of this application, when Q1 or Q2 is in the switch-off state, the current does not flow between the D pole and the S pole. In some other embodiments, in addition to the MOS transistor, a component corresponding to Q1 may be integrated with a diode (for example, an iron diode) pointing from the D pole to the S pole. When the MOS transistor is switched off, the current can still flow between the D pole and the S pole through the iron diode. In this example, more iron diodes may be arranged in Q1, to hedge a current generated by the iron diode between the D pole and the S pole.

An example in which an iron diode 1 and an iron diode 2 are arranged in Q1 is used. Directions of current conduction flows of the iron diode 1 and the iron diode 2 may be opposite. Therefore, when the MOS transistor in Q1 is in the switch-off state, even if there is a current conducting through the iron diode 1, the current may be cut off at the iron diode 2. Therefore, Q1 may be switched off by controlling the MOS transistor to be switched off, and there is no current flowing through Q1.

Based on the composition of the power supply module 640 shown in FIG. 7, the Buck circuit may be in a conduction state when it is necessary to charge the battery or supply power to the load. In the conduction state, both Q1 and Q2 are in the switch-on state, the Buck circuit may be used to process the external current, to obtain an electrical signal that can supply power to the load, or a power supply signal that supplies power to the battery. The processing by the Buck circuit on the external current may include but is not limited to voltage reduction, rectification, and the like. After the electrical signal that can supply power to the load is obtained, the electrical signal may be output, through the output end 72, to the load for power supply, or may be output, through the output end 72, to the battery for power supply.

When the Buck circuit is in the interruption state, Q1 is switched off, and Q2 is switched off. In this case, the Buck circuit is interrupted, and the output end 72 does not output a signal. In this case, when a load runs, power may be supplied to the load through the battery module 641.

It should be noted that, to achieve accurate control on the power supply strategy of the electronic device, the power supply module 640 (for example, the power supply control unit of the power supply module 640) may further obtain other data of the electronic device for reference. For example, the other data of the electronic device may include a real-time voltage of the battery in the battery module 642, a temperature of the battery in the battery module 642, an ambient temperature, and the like. In some embodiments, the other data of the electronic device may be obtained by the power supply module 640 itself. In some other embodiments, some or all of the other data of the electronic device may also be obtained by power supply module 640 from another component (for example, the processor 610, the sensor module 680, or the like) of the electronic device.

In addition, FIG. 7 is merely one implementation of the Buck circuit, and does not constitute a limitation on the Buck circuit in embodiments of this application. In some other implementations, the Buck circuit may further include more or fewer components.

The following describes the composition of the battery module 641 shown in FIG. 6 by using an example.

FIG. 8 is a schematic diagram of composition of a battery module 641 according to this application. The battery module 641 may include a battery or a battery pack, and a battery switching unit.

The battery pack may include one or more batteries. When the battery pack includes a plurality of batteries, different batteries may be connected in series or in parallel. In different implementations, the battery pack may include a lithium ion battery, a lithium polymer battery, a nickel cadmium battery, a nickel metal hydride battery, a lithium iron phosphate battery, and the like. The battery pack may be configured to store electrical energy, to supply power to the load when there is no external current input. When a power level of the battery pack is low, the battery pack may be charged to store energy.

For ease of description, in the following examples, the battery pack is referred to as the battery.

The battery module 641 may further include a battery switching unit. The battery switching unit may include an on state and an off state. When the battery switching unit is on, the battery may be charged or the battery may supply power to the load. When the battery switching unit is off, the charging on the battery and/or the power supply for the load may be stopped.

In this example, an example in which the battery switching unit is an N-type MOS transistor Q3 is used. As shown in FIG. 8, a D pole of Q3 may be coupled to the battery, and a G pole of Q3 is used as a control end 82 of the battery module 641. Q3 may be controlled, through this control end 82, to operate in the switch-on/switch-off state. The switch-off state corresponds to the off state of the battery switching unit. An S pole of Q3 may be used as a port 81 of the battery module 641, so that the battery may supply power to the load when Q3 is switched on. Alternatively, when Q3 is switched on, an external current is received through the port 81 for charging. For example, the port 81 may also be referred to as a first end.

It should be understood that with reference to the description in FIG. 7, in this example, Q3 may correspond to an MOS transistor. An iron diode may not be integrated in Q3. In this way, an effect of controlling Q3 to be in the switch-on/switch-off state is implemented by controlling the MOS transistor to be switched on/off. Certainly, when an iron diode is integrated in Q3, for a processing manner, refer to the foregoing arrangement of the plurality of iron diodes in Q1. Details are not described herein again.

The following describes a power supply structure of the electronic device by using an example in which the power supply module 640 has the composition shown in FIG. 7 and the battery module 641 has the composition shown in FIG. 8.

Figure 9:
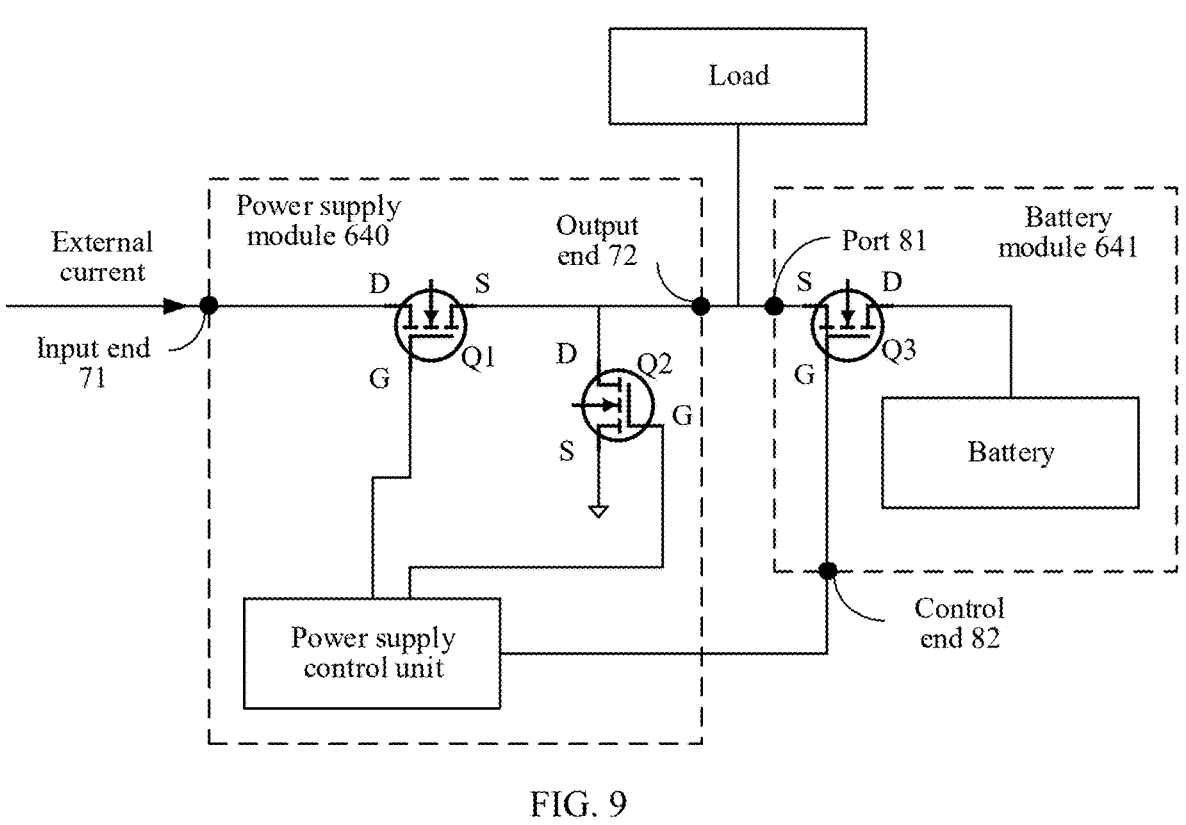
FIG. 9 is a schematic diagram of composition of a power supply system according to an embodiment of this application.

For example, refer to FIG. 9. An output end 72 of the power supply module 640 may be coupled to a load. A port 81 of the battery module 641 may also be coupled to the output end 72 or the load. A control end 82 of the battery module 641 may be coupled to the power supply control unit of the power supply module 640, to control the switch-on/switch-off state of Q3 under control of the power supply control unit.

The power supply structure having the structure shown in FIG. 9 can implement functions such as supplying, through the Buck circuit, power to the load by using the external current, charging the battery by using the external current, supplying power to the load by using the battery, and the like.

Figure 10:
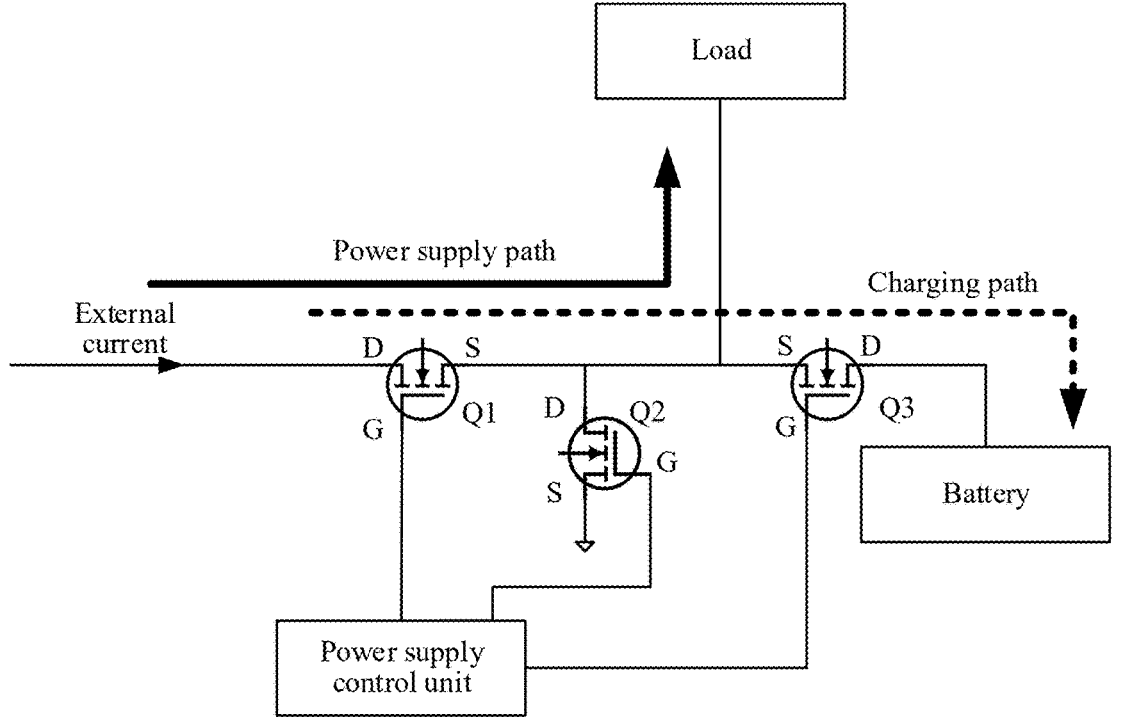
FIG. 10 is a schematic diagram of power supply and charging of a power supply system according to an embodiment of this application.

For example, as shown in FIG. 10, the power supply control unit may control Q1 to be switched on, control Q2 to be switched on, and control Q3 to be switched off, so that the external current may supply power to the load through a power supply path. The power supply control unit may further control Q1 to be switched off, control Q2 to be switched off, and control Q3 to be switched on, so that the battery may supply power to the load. The power supply control unit may further control Q1 to be switched on, control Q2 to be switched off, and control Q3 to be switched on, so that the external current may supply power to the battery through the charging path.

The solution provided in embodiments of this application can be applied to any electronic device provided in FIG. 6 to FIG. 10.

With reference to the description in FIG. 4, under an existing OVP protection mechanism, the problem of the power supply oscillation may occur. In this embodiment of this application, when the solution is applied to the electronic device shown in FIG. 6 to FIG. 10, a high impedance (HIZ) mode is introduced, so that the voltage of the battery can fall below the OVP threshold before OVP protection is triggered. In this way, the OVP protection procedure shown in FIG. 4 is not entered, thereby avoiding the power supply oscillation.

The following describes the solution provided in embodiments of this application in detail still by using the scenario in which the current temperature (for example, the ambient temperature or the battery temperature) in the charging process changes from the temperature 1 in the charging temperature range to the temperature 2 in the non-charging temperature range, and the OVP protection is triggered.

Figure 11:
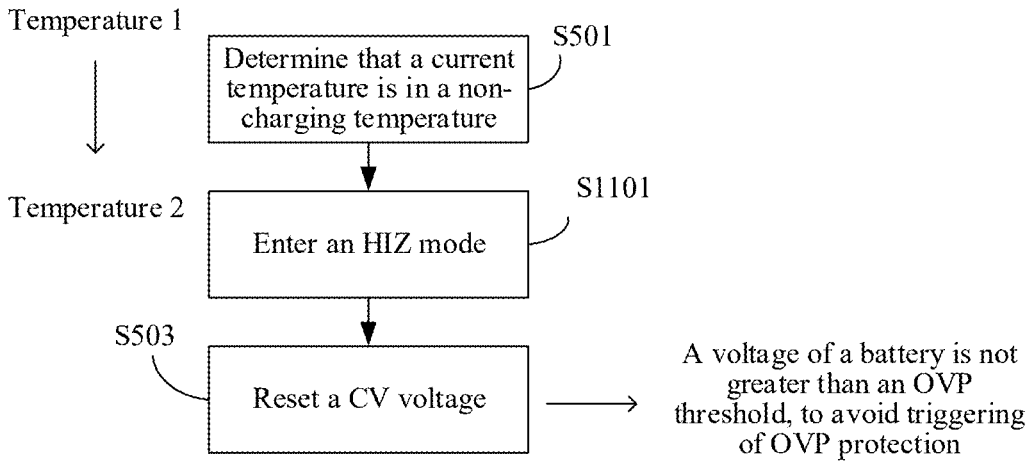
FIG. 11 is a schematic flowchart of a power supply control method according to an embodiment of this application.

For example, FIG. 11 is an overall schematic flowchart of a solution according to an embodiment of this application. With reference to the example in FIG. 5, in S501, that is, when it is determined that the current temperature is in the non-charging temperature range, the power supply control unit may perform S1101: Enter an HIZ mode. A specific implementation of the HIZ mode is described in detail below. Through performing S1101, the voltage of the battery can be steadily reduced below the OVP threshold. The OVP threshold may be a corresponding OVP threshold after the CV voltage is reset. Therefore, S503 continues to be performed, that is, after the CV voltage is reset, the voltage of the battery is not greater than the OVP threshold, thereby avoiding triggering of the OVP protection.

In other words, before the CV voltage is reset, the voltage of the battery can be reduced below a new OVP threshold in advance by executing the HIZ mode, thereby avoiding triggering of the OVP protection, and avoiding the power supply oscillation shown in FIG. 4.

Figure 12:
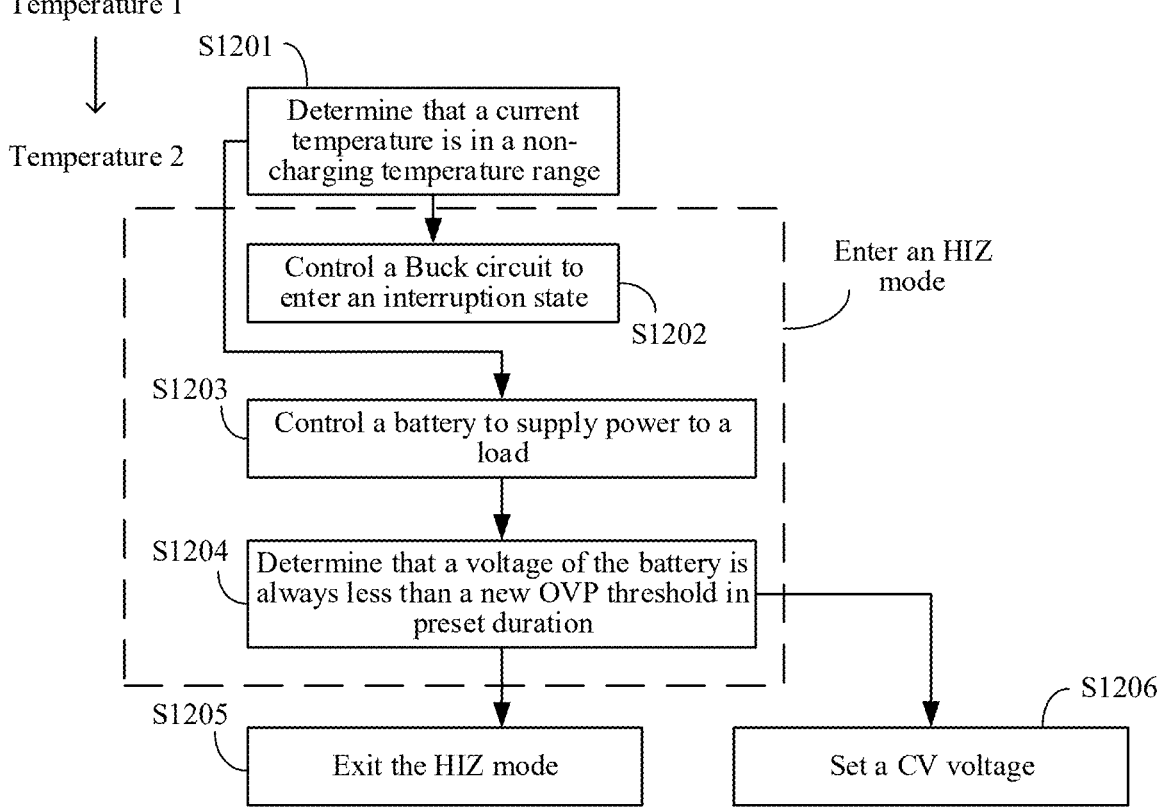
FIG. 12 is a schematic flowchart of another power supply control method according to an embodiment of this application.

FIG. 12 is a schematic diagram of a specific process of entering an HIZ mode according to an embodiment of this application. In this embodiment of this application, the HIZ mode may include: controlling the battery to supply power to the load, and interrupting the Buck circuit.

The solution may be executed by the power supply control unit. Alternatively, the solution may be preset in a processor of the electronic device, and the processor may perform corresponding control through the power supply control unit, to implement the solution shown in FIG. 12.

As shown in FIG. 12, the solution may include:

S1201. Determine that the current temperature is in the non-charging temperature range when the current temperature of the electronic device changes from the temperature 1 to the temperature 2.

The temperature 1 may be a temperature in the charging temperature range. The temperature 2 may be a temperature in the non-charging temperature range. In the following description, a temperature (for example, the temperature 1) in the charging temperature range may also be referred to as a normal temperature. An environment that provides a normal temperature is referred to as a normal environment. Correspondingly, a temperature (for example, the temperature 2) in the non-charging temperature range may also be referred to as an abnormal temperature. An environment that provides an abnormal temperature is referred to as an abnormal environment.

It should be understood that a specific implementation process of S1201 is similar to that of S501, and reference may be made to each other.

When the electronic device is in the abnormal environment, it is determined through temperature detection that the current temperature is in the non-charging temperature range, and in this case, S1202 is triggered.

S1202. Control the Buck circuit to enter an interruption state.

For example, with reference to the example in FIG. 7, or FIG. 9, or FIG. 10, the controlling the Buck circuit to enter an interruption state may include: controlling, by the power supply control unit, Q1 to be switched off and Q2 to be switched off. In this way, charging on the battery is stopped, to prevent the voltage of the battery from continuing to rise.

S1203. Control the battery to supply power to the load.

For example, with reference to the examples in FIG. 8, or FIG. 9, or FIG. 10, the controlling the battery to supply power to the load may include: controlling, by the power supply control unit, Q3 to be switched on. In this way, the voltage of the battery is reduced by supplying power to the load.

Figure 13:
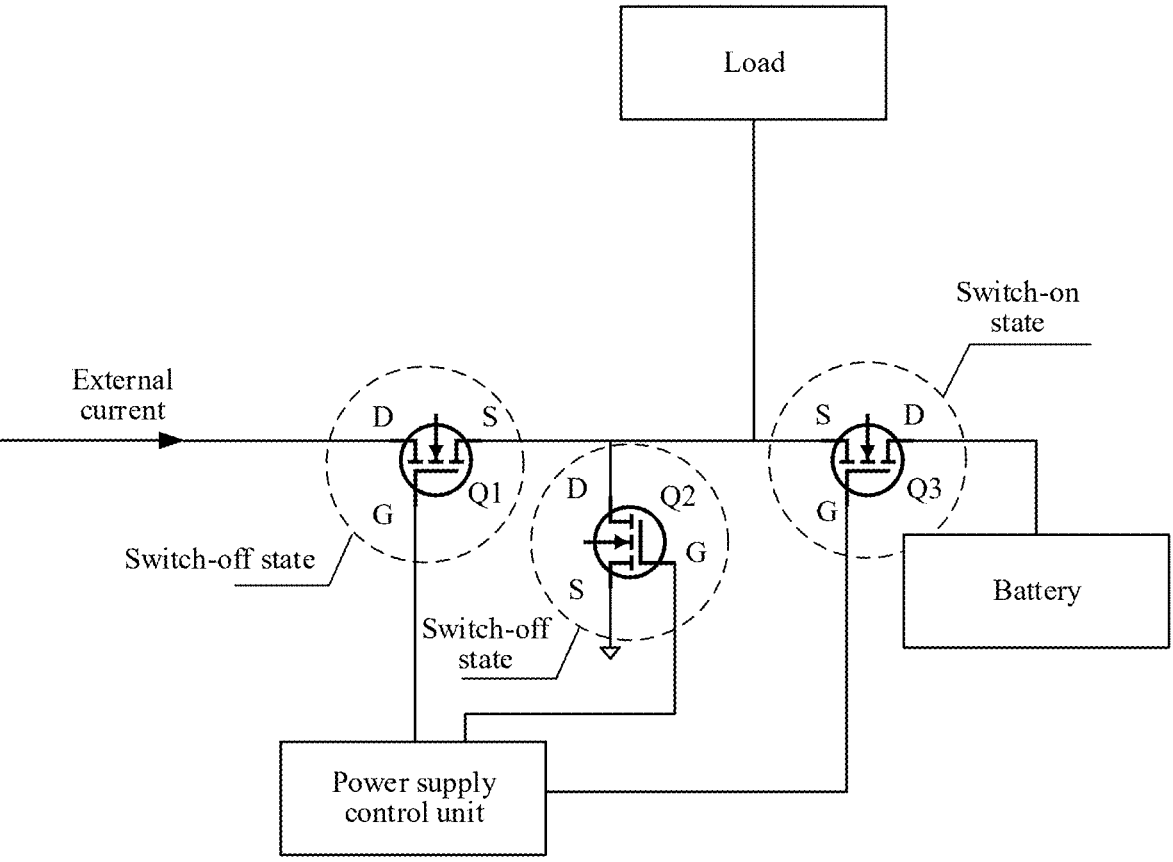
FIG. 13 is a schematic diagram of a state of a power supply system according to an embodiment of this application.

With reference to S1202 and S1203, FIG. 13 is an example of a circuit state after S1202 and S1203 are performed. As shown in FIG. 13, Q1 is in the switch-off state, Q2 is in the switch-off state, and Q3 is in the switch-on state. In this way, the battery can directly supply power to the load, thereby releasing electrical energy in the battery and reducing the voltage (that is, discharge to release voltage).

It should be noted that an order of performing S1202 and S1203 may be different in different implementations of this application.

In some implementations, the power supply control unit of the electronic device may first control the battery to supply power to the load (for example, S1203), that is, control Q3 to be switched on, so that the battery can discharge and release voltage as early as possible. Next, the power supply control unit of the electronic device may control the Buck circuit to enter the interruption state (for example, S1202), that is, control Q1 and Q2 to be switched off, thereby preventing the voltage of the battery from rising again due to charging on the battery through the external current. In addition, avoid slowdown in a rate of battery discharge and voltage release due to both the external current and the battery supplying power to the load.

In some other implementations, the power supply control unit of the electronic device may also perform S1202 and S1203 simultaneously, to be specific, simultaneously control Q1 to be switched off, control Q2 to be switched off, and control Q3 to be switched on, so that the battery can efficiently discharge and release voltage.

S1204. Determine that the voltage of the battery is always less than a new OVP threshold in preset duration.

With reference to the foregoing description, the power supply control unit of the power supply module 640 may detect the voltage of the battery. In different implementations, the detection on the voltage of the battery may be continuous, thereby obtaining the voltage of the battery in real time. In some other implementations, the detection on the voltage of the battery may be intermittently sampled, thereby reducing overheads in a process of obtaining the voltage of the battery.

In addition, a capability of detecting the voltage of the battery may be possessed by the power supply control unit itself. In some other implementations of this application, the power supply control unit may further obtain the voltage of the battery through a processor or another component of the electronic device.

In this example, based on the capability of detecting the voltage of the battery, the electronic device may determine that the voltage of the battery is always less than the new OVP threshold in the preset duration. In other words, the voltage of the battery is stabilized in a safe range by performing discharge and voltage release in the foregoing steps.

It should be understood that the OVP threshold may be flexibly adjusted based on the CV voltage. With reference to the description in FIG. 5, when the electronic device is at an abnormal temperature, the battery may be protected in the abnormal environment by adjusting the CV voltage.

An example in which the CV voltage is a first voltage in the normal environment (for example, the current temperature is the temperature 1), and the CV voltage is to be set to a second voltage in the abnormal environment is used. In general, the second voltage may be less than the first voltage due to environmental deterioration, thereby reducing the OVP threshold and better protecting the battery. For example, the first voltage may be set to 4.38 V and the second voltage may be set to 4.1 V.

In S1204, the electronic device may obtain the second voltage, thereby determining an OVP threshold in the abnormal environment. The OVP threshold in the abnormal environment is the new OVP threshold.

In this case, before the CV voltage is set to the second voltage, the electronic device may implement discharge and voltage release on the battery by performing S1202 and S1203. In S1204, the voltage of the battery may be stabilized below the OVP threshold determined based on the second voltage. This can ensure that even if the CV voltage is set to a more stringent second voltage, the OVP protection is not triggered to enter the procedure shown in FIG. 4. In this way, the power supply oscillation is avoided.

In this embodiment of this application, the foregoing control process in S1202 to S1204 may correspond to entering the HIZ mode in S1101 shown in FIG. 11. In other words, the Buck circuit may be interrupted by entering the HIZ mode, to stop supplying power to the load and charging the battery. In addition, by entering the HIZ mode, the battery may supply power to the load, to implement discharge and voltage release. The power supply from the battery to the load is not later than a moment at which the Buck circuit enters the interruption state, so that there is no reduction in the power supply voltage caused by the battery not supplying power to the load after the Buck circuit enters the interruption state.

S1205. Exit the HIZ mode.

For example, the power supply control unit of the electronic device may control the Buck circuit to restore to the conduction state.

It should be understood that in native logic shown in FIGS. 5, Q1 and Q2 in the Buck circuit may be in the switch-on state when the battery is charged. In this example, to enable the battery to perform discharge and voltage release, the Buck circuit is controlled to enter the HIZ mode. After S1204 is performed, it may be determined that the voltage of the battery has fallen below the OVP threshold, and the OVP protection is not triggered. In this way, the electronic device may control the Buck circuit to exit the HIZ mode, to restore to the previous conduction state.

S1206. Set the CV voltage.

Therefore, after the HIZ mode is exited, the power supply control on the load is switched to normal logic, and a coping mechanism in the case of entering the abnormal temperature shown in FIG. 5 continues. For example, a new CV voltage is set, to perform the OVP protection when the voltage of the battery is excessively high.

In this example, discharge and voltage release have been performed on the battery before the CV voltage is set. In S1204, it is ensured that the voltage of the battery is steadily less than the OVP threshold by continuously performing detection in the preset duration. In this way, a case in which a transient voltage is less than the OVP threshold, and the voltage of the battery is greater than the OVP threshold again after the Buck circuit is controlled to supply power does not occur.

Therefore, in the solution provided in this application, discharge and voltage release may be performed on the battery in advance before setting the CV voltage and after entering the abnormal environment. In this way, frequent triggering of the OVP protection is avoided without greatly modifying native battery protection logic, thereby avoiding the corresponding power supply oscillation.

It should be understood that the solutions provided in the examples in FIG. 11 and FIG. 12 can resolve the problem of the power supply oscillation caused by the voltage of the battery being greater than the OVP threshold due to an abnormal temperature change. It should be understood that a capability of the battery to withstand the maximum voltage may also be affected in some other abnormal situations. In view of this, the HIZ mode provided in embodiments of this application can also be used to avoid repeated triggering of the OVP protection while implementing the overvoltage protection on the battery.

It should be noted that in S1206, the setting of the new CV voltage may follow logic previously set in the electronic device. For example, in the normal environment, the CV voltage may be set to the first voltage. In the abnormal environment, the CV voltage may be set to the second voltage. The second voltage may be less than the first voltage. For example, the first voltage may be set to 4.38 V, and the second voltage may be set to 4.1 V. Correspondingly, when the CV voltage is set to 4.1 V, a voltage range corresponding to the OVP threshold may be from 3.9 V to 4.1 V. When the voltage of the battery is less than 3.9 V, it is considered that the battery is not at the risk of overvoltage. Correspondingly, when the voltage of the battery is greater than 4.1 V, it is considered that the battery is at the risk of overvoltage, and in this case, the OVP protection is triggered.

In some other embodiments of this application, based on introducing of the HIZ mode shown in FIG. 11 or FIG. 12, the battery can be better protected from the risk of overvoltage. In step S1206, the new CV voltage may also be set by the electronic device (for example, the power supply control unit of the electronic device) based on a current voltage value.

For example, FIG. 14 is a schematic flowchart of still another power supply control method according to an embodiment of this application. In this solution, the power supply control unit of the electronic device can flexibly adjust the new CV voltage based on the voltage of the battery. The CV voltage can be adjusted more properly without triggering the OVP protection, thereby providing better overvoltage protection for the battery. It should be noted that in some other implementations of this application, an execution entity of the solution shown in FIG. 14 may also be another module in the electronic device having a control capability, for example, a processor.

As shown in FIG. 14, the solution may include:

S1401. Determine that the current temperature is in the non-charging temperature range when a CV voltage value is a first voltage. The current temperature may be in the charging temperature range before the current temperature is in the non-charging temperature range. Correspondingly, the CV voltage may be the first voltage, for example, 4.38 V, when the current temperature is in the charging temperature range.

S1402. Determine that the CV voltage to be set is a second voltage. The second voltage may be a CV voltage that needs to be adjusted based on a native CV adjustment strategy when the current temperature is in the non-charging temperature range. The second voltage may be less than the first voltage. For example, the second voltage may be set to 4.1 V.

S1403. Judge whether the second voltage is greater than a first value. The first value may be determined based on the maximum voltage that the battery can withstand in the non-charging temperature range, and is preset in the electronic device. For example, the first value may be set to 4.1 V.

In some other embodiments of this application, different first values may be selected based on the current temperature that is greater or less than the charging temperature range. For example, when the temperature is greater than the charging temperature range, the maximum voltage that the battery can withstand is a voltage A. When the temperature is less than the charging temperature range, the maximum voltage that the battery can withstand is a voltage B. In S1403, the electronic device may flexibly select the first value as A or B based on the current temperature. Further, it may be judged more accurately whether the second voltage is greater than the first value.

When the second voltage is greater than the first value, S1404 is performed. Otherwise, when the second voltage is less than the first value, S1407 is performed.

S1404. Judge whether the electronic device is currently in an HIZ mode. The HIZ mode may include that the Buck circuit is in the HIZ mode and the battery is supplying power to the load. To be specific, Q1 and Q2 are switched off, and Q3 is switched on.

It should be understood that when the second voltage is greater than the first value, the corresponding OVP threshold is higher. In this case, in S1404, it may be judged whether the electronic device is currently in the HIZ mode, to perform a subsequent operation.

With reference to the description in FIG. 13, when Q1 and Q2 are switched off, and Q3 is switched on, it is determined that the electronic device is currently in the HIZ mode. Otherwise, it is determined that the electronic device is not currently in the HIZ mode.

As a specific implementation, a flag bit corresponding to a state of the HIZ mode may be arranged in the electronic device. For example, the flag bit may identify, through a binary number, whether the electronic device is currently in the HIZ mode. As an example, when the electronic device enters the HIZ mode, the flag bit may be set to 1, to correspondingly identify that the electronic device is currently in the HIZ mode. On the contrary, when the electronic device exits the HIZ mode, the flag bit may be set to 0, to correspondingly identify that the electronic device is not currently in the HIZ mode. In a process of performing S1404, it may be determined whether the electronic device is in the HIZ mode based on the flag bit. For example, the electronic device may read a value of the flag bit, and when the value of the flag bit is 1, it is determined that the electronic device is currently in the HIZ mode. On the contrary, when the value of the flag bit is 0, it is determined that the electronic device is not currently in the HIZ mode.

When it is determined that the electronic device is currently in the HIZ mode, the following S1405 and S1406 are performed. On the contrary, when it is determined that the electronic device is not currently in the HIZ mode, S1406 is directly performed.

S1405. Exit the HIZ mode. For example, because the battery currently does not require additional overvoltage protection, the HIZ mode may be exited, so that the power supply module can operate normally and efficiently. In some embodiments, after the HIZ mode is exited, states of the Buck circuit and the battery switching unit in the battery module may be restored to the state before the HIZ mode is entered. For example, Q1 and Q2 may be switched on, and Q3 may be switched off.

S1406. Set the CV voltage to the first voltage.

Therefore, the HIZ mode may be exited based on the native CV adjustment strategy when the CV voltage that needs to be adjusted is high. In this way, the power supply module may operate normally and efficiently, and the risk of overvoltage of the battery does not occur. To be specific, the OVP protection is not triggered to cause the power supply oscillation S1407. Obtain the voltage of the battery.

In this example, if the CV voltage to be set is low, the corresponding OVP threshold is also low. In this case, the OVP protection may be frequently triggered.

In this example, the electronic device may determine, based on the voltage of the battery, whether to perform discharge and voltage release on the battery by using the HIZ mode, to prevent the OVP protection from being triggered.

S1408. Judge whether the electronic device is currently in an HIZ mode.

When the electronic device is in the HIZ mode, S1409 and a subsequent process are performed. On the contrary, when the electronic device is not in the HIZ mode, S1412 and a subsequent process are performed.

S1409. Judge whether the voltage of the battery is less than a first OVP threshold.

The first OVP threshold may be an OVP threshold corresponding to a currently smaller second voltage (that is, the second voltage that is not greater than the first value). An example in which the OVP threshold corresponds to a voltage range is used, the first OVP threshold may be a lower limit of the voltage range.

For example, an example in which the second voltage is 4.1 V is used. The voltage range of the corresponding OVP threshold may be from 3.9 V to 4.1 V. In this case, the first OVP threshold is 3.9 V.

In this example, whether the OVP protection is likely to be triggered is determined by judging whether the voltage of the battery is less than a lower voltage limit of the OVP threshold (that is, the first OVP threshold), to adopt a corresponding strategy.

For example, when the voltage of the battery is less than the first OVP threshold, S1410 is performed. When the voltage of the battery is not less than the first OVP threshold, S1406 is performed.

It should be understood that when the voltage of the battery is greater than or equal to the first OVP threshold, the current Buck circuit is already in the HIZ mode. Therefore, the voltage of the battery may continuously decrease. Based on the HIZ mode, it can be ensured that the voltage of the battery falls below the OVP threshold before the HIZ mode is exited. Therefore, the current HIZ mode may continue to be maintained and the CV voltage can be set to a greater first voltage (for example, S1406).

S1410. Exit the HIZ mode.

Corresponding to S1409, when the voltage of the battery is less than the first OVP threshold, it may be ensured that the voltage of the battery does not trigger the OVP protection. There is no need to perform discharge and voltage release on the battery. In S1410, the Buck circuit may be controlled to exit the HIZ mode. Then, S1411 continues to be performed.

S1411. Set the CV voltage to the second voltage.

Because the voltage of the battery is already less than the OVP threshold, the CV voltage may be set to the second voltage, for example, 4.1 V, based on the native CV adjustment strategy.

S1412. Judge whether the voltage of the battery is greater than a second OVP threshold.

The second OVP threshold may be an OVP threshold corresponding to a currently smaller second voltage (that is, the second voltage that is not greater than the first value). An example in which the OVP threshold corresponds to a voltage range, the second OVP threshold may be an upper limit of the voltage range.

For example, an example in which the second voltage is 4.1 V is used. The voltage range of the corresponding OVP threshold may be from 3.9 V to 4.1 V. In this case, the second OVP threshold is 4.1 V.

In this example, whether the OVP protection is likely to be triggered is determined by judging whether the voltage of the battery is greater than an upper voltage limit of the OVP threshold (that is, the second OVP threshold), to adopt a corresponding strategy.

For example, when the voltage of the battery is greater than the second OVP threshold, S1413 is performed. On the contrary, when the voltage of the battery is less than the second OVP threshold, S1411 is performed.

It should be understood that when the voltage of the battery is less than the second OVP threshold, if the CV voltage is adjusted to the second voltage, the voltage of the battery does not exceed the corresponding OVP threshold, that is, the OVP protection is not triggered. Then, the electronic device may perform S1411 to set the CV voltage to the second voltage based on the native CV adjustment strategy.

S1413. Enter the HIZ mode.

In this example, if the voltage of the battery is greater than the second OVP threshold, it indicates that the voltage of the battery is high, and there is a risk of overvoltage. In S1413, the electronic device may be controlled to enter the HIZ mode. For example, Q1 and Q2 of the Buck circuit are controlled to be in the switch-off state, and Q3 is controlled to be in the switch-on state. This stops supplying power to the load and charging the battery. In addition, the battery may start to supply power to the load to perform discharge and voltage release.

Next, the electronic device may perform S1406, for example, set the CV voltage to a greater first voltage (for example, 4.38 V), thereby avoiding accidental triggering of the OVP protection that may occur when the voltage of the battery is relatively high.

Therefore, through this example of the solution shown in FIG. 14, with reference to the description of the solution shown in FIG. 12, a person skilled in the art should be able to have a clear and accurate understanding of the solutions provided in embodiments of this application. The power supply control solution provided in embodiments of this application can avoid the triggering of the OVP protection while effectively providing the overvoltage protection for the battery, thereby avoiding the power supply oscillation.

The solutions provided in embodiments of this application are mainly described above from a perspective of the electronic device. To implement the foregoing functions, the electronic device includes a corresponding hardware structure and/or a corresponding software module for performing each function. A person skilled in the art should be easily aware that, in combination with the example units and algorithm steps of the examples described in the embodiments disclosed in this specification, this application can be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

In embodiments of this application, the device may be divided into functional modules based on the foregoing method examples. For example, each functional module may be divided according to each function, or two or more functions may be integrated into one processing module. The foregoing integrated module may be implemented in a form of hardware, or may be implemented in a form of a software functional module. It should be noted that module division in embodiments of this application is an example and is merely logical function division, and there may be another division manner in actual implementation.

Figure 15:
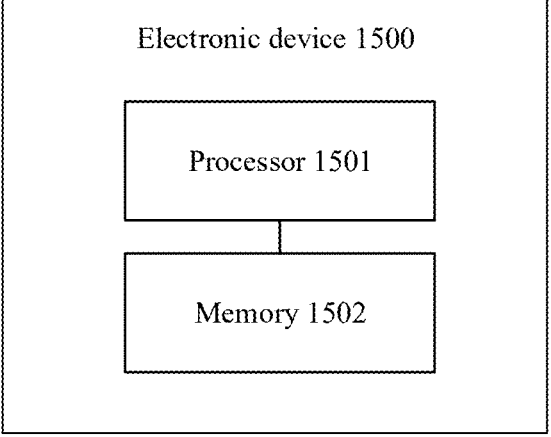
FIG. 15 is a schematic diagram of composition of another electronic device according to an embodiment of this application.

For example, FIG. 15 is a schematic diagram of composition of an electronic device 1500 according to an embodiment of this application. As shown in FIG. 15, the electronic device 1500 may include a processor 1501 and a memory 1502. In some embodiments, the processor 1501 may correspond to the power supply module (for example, the charger IC) in the foregoing examples. The memory 1502 is configured to store computer executable instructions. When the processor 1501 executes the instructions stored in the memory 1502, the electronic device 1500 is enabled to perform any technical solution in the foregoing embodiments.

It should be noted that all related content of the steps in the foregoing method embodiments may be cited in function description of corresponding functional modules. Details are not described herein again.

Figure 16:
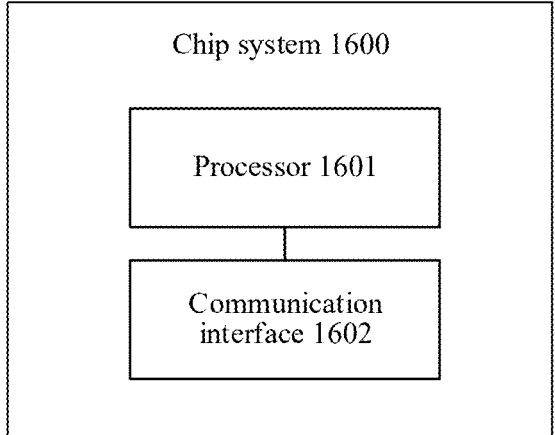
FIG. 16 is a schematic diagram of composition of a chip system according to an embodiment of this application.

FIG. 16 is a schematic diagram of composition of a chip system 1600 according to an embodiment of this application. The chip system 1600 may include a processor 1601 and a communication interface 1602, and is configured to support a power supply apparatus in implementing the functions in the foregoing embodiments. In a possible design, the chip system 1600 further includes a memory. The memory is configured to store program instructions and data that are necessary for a terminal. The chip system 1600 may include a chip, or may include a chip and another discrete device.

Through the descriptions of the foregoing implementations, a person skilled in the art may clearly understand that, for the purpose of convenient and brief description, only division of the foregoing functional modules is used as an example for description. In actual application, the foregoing functions may be allocated to and completed by different functional modules according to requirements, that is, an inner structure of an apparatus is divided into different functional modules to complete all or some of the functions described above.

In the several embodiments provided in this application, it should be understood that, the disclosed apparatus and method may be implemented in other manners. For example, the described apparatus embodiments are merely examples. For example, the module or unit division is merely logical function division and may be other division during actual implementations. For example, a plurality of units or components may be combined or integrated into another apparatus, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate. Parts displayed as a unit may be one physical unit or a plurality of physical units, that is, may be located in one place, or may be distributed to different places. Some or all of the units may be selected based on actual requirements to achieve the objectives of solutions of embodiments.

In addition, functional units in embodiments of this application may be integrated into one processing unit, each of the units may exist alone physically, or two or more units may be integrated into one unit. The integrated unit may be implemented in a form of hardware, or may be implemented in a form of a software functional unit.

When the integrated unit is implemented in the form of a software functional unit and sold or used as an independent product, the integrated unit may be stored in a readable storage medium. Based on such an understanding, the technical solutions in embodiments of this application essentially, or the part contributing to the conventional technology, or all or some of the technical solutions may be implemented in the form of a software product. The software product is stored in a storage medium and includes several instructions for instructing a device (which may be a single-chip microcomputer, a chip, or the like) or a processor (processor) to perform all or some of the steps of the methods described in embodiments of this application. The foregoing storage medium includes: any medium that can store program code, such as a USB flash drive, a removable hard disk, a read-only memory (Read-Only Memory, ROM), a random access memory (Random Access Memory, RAM), a magnetic disk, or a compact disc.

The foregoing descriptions are merely specific implementations of this application, but are not intended to limit the protection scope of this application. Any variation or replacement within the technical scope disclosed in this application shall fall within the protection scope of this application. Therefore, the protection scope of this application shall be subject to the protection scope of the claims.

The invention claimed is:

1. A power supply control method, applied to an electronic device, wherein a power supply module, a battery module, and a load are arranged in the electronic device;

wherein an input end of the power supply module is coupled to an external power supply, to receive an external current, and an output end of the power supply module is coupled to the battery module and the load respectively, to charge a battery in the battery module and/or supply power to the load; and wherein the battery module is coupled to the load at a first end, and the battery module is configured to supply power to the load through the first end;

wherein a first overvoltage protection (OVP) threshold is set for the electronic device; and wherein the method comprises:

when a voltage of the battery is greater than the first OVP threshold:

controlling the power supply module not to supply power to the load;

controlling the power supply module not to charge the battery in the battery module; and controlling the battery in the battery module to supply power to the load until the voltage of the battery is always less than a second OVP threshold in a preset duration, wherein the second OVP threshold is less than the first OVP threshold;

wherein the power supply module comprises a first switching unit and a second switching unit, wherein an operating status of the first switching unit or the second switching unit comprises a switch-on state and a switch-off state, and the power supply module further comprises a power supply control unit, wherein the power supply control unit is configured to control operating statuses of the first switching unit and the second switching unit through control ends of the first switching unit and the second switching unit; and wherein controlling the power supply module not to supply power to the load and controlling the power supply module not to charge the battery in the battery module comprises:

controlling, by the power supply control unit, the first switching unit and the second switching unit to operate in the switch-off state.

2. The method according to claim 1, wherein the first OVP threshold is determined by the electronic device based on a first constant voltage (CV) voltage set in advance, the second OVP threshold is determined by the electronic device based on a second CV voltage, and the second CV voltage is less than the first CV voltage.

3. The method according to claim 2, wherein before the controlling the power supply module not to supply power to the load, a CV voltage in the electronic device is the first CV voltage; and wherein the method further comprises:

when the power supply module charges the battery, and when the electronic device determines that a current temperature is in a non-charging temperature range, adjusting the CV voltage to the second CV voltage for triggering overvoltage protection for the battery, wherein the current temperature is a current battery temperature, or an ambient temperature of the electronic device.

4. The method according to claim 3, wherein a charging temperature range is in a range of 0 degrees Celsius to 50 degrees Celsius, and the non-charging temperature range is in a range less than 0 degrees Celsius and greater than 50 degrees Celsius.

5. The method according to claim 1, wherein the power supply module supplies power to the load before the electronic device is triggered to perform overvoltage protection on the battery.

6. The method according to claim 5, wherein the method further comprises:

after controlling the battery in the battery module to supply power to the load until the voltage of the battery is always less than the second OVP threshold in the preset duration, controlling the power supply module to supply power to the load.

7. The method according to claim 1, wherein the battery module comprises the battery and a third switching unit, the third switching unit is arranged between the battery and the first end, a control end of the third switching unit is coupled to the power supply control unit, and the third switching unit operates in the switch-on state or the switch-off state under control of the power supply control unit; and wherein controlling the battery in the battery module to supply power to the load comprises:

controlling, by the power supply control unit, the third switching unit to operate in the switch-on state.

8. The method according to claim 1, wherein the method further comprises:

after controlling the battery in the battery module to supply power to the load until the voltage of the battery is always less than a second OVP threshold in the preset duration, controlling, by the power supply control unit, the first switching unit and the second switching unit to operate in the switch-on state, to facilitate the power supply module to supply power to the load.

9. The method according to claim 7, wherein the first switching unit, the second switching unit, and the third switching unit are MOS transistors.

10. The method according to claim 9, wherein the first switching unit and the second switching unit form a Buck circuit.

11. The method according to claim 9, wherein the power supply module is a Charger IC.

12. An electronic device, wherein the electronic device comprising:

a power supply module;

a battery module; and a load;

wherein an input end of the power supply module is coupled to an external power supply, to receive an external current, and an output end of the power supply module is coupled to the battery module and the load respectively, to charge a battery in the battery module and/or supply power to the load; and wherein the battery module is coupled to the load at a first end, and the battery module is configured to supply power to the load through the first end;

wherein a first overvoltage protection (OVP) threshold is set for the electronic device;

wherein the power supply module comprises a first switching unit and a second switching unit, wherein an operating status of the first switching unit or the second switching unit comprises a switch-on state and a switch-off state, and the power supply module further comprises a power supply control unit, wherein the power supply control unit is configured to control operating statuses of the first switching unit and the second switching unit through control ends of the first switching unit and the second switching unit; and wherein the power supply control unit is configured to:

when a voltage of the battery is greater than the first OVP threshold:

control the power supply module not to supply power to the load;

control the power supply module not to charge the battery in the battery module; and control the battery in the battery module to supply power to the load until the voltage of the battery is always less than a second OVP threshold in a preset duration, wherein the second OVP threshold is less than the first OVP threshold; and wherein controlling the power supply module not to supply power to the load and controlling the power supply module not to charge the battery in the battery module comprises:

controlling, by the power supply control unit, the first switching unit and the second switching unit to operate in the switch-off state.

13. The electronic device according to claim 12, wherein the first OVP threshold is determined by the electronic device based on a first constant voltage (CV) voltage set in advance, the second OVP threshold is determined by the electronic device based on a second CV voltage, and the second CV voltage is less than the first CV voltage.

14. The method according to claim 2, wherein the power supply module supplies power to the load before the electronic device is triggered to perform overvoltage protection on the battery.

15. The method according to claim 7, wherein the method further comprises:

after controlling the battery in the battery module to supply power to the load until the voltage of the battery is always less than the second OVP threshold in the preset duration, controlling, by the power supply control unit, the first switching unit and the second switching unit to operate in the switch-on state, to facilitate the power supply module to supply power to the load.

16. The electronic device according to claim 12, wherein the power supply module supplies power to the load before the power supply control unit is triggered to control the power supply module not to supply power to the load and control the power supply module not to charge the battery in the battery module.

17. The electronic device according to claim 16, wherein the power supply control unit is further configured to:

after controlling the battery in the battery module to supply power to the load until the voltage of the battery is always less than the second OVP threshold in the preset duration, control the power supply module to supply power to the load.

18. The electronic device according to claim 12, wherein the battery module comprises the battery and a third switching unit, the third switching unit is arranged between the battery and the first end, a control end of the third switching unit is coupled to the power supply control unit, and the third switching unit operates in the switch-on state or the switch-off state under control of the power supply control unit; and wherein controlling the battery in the battery module to supply power to the load comprises:

controlling the third switching unit to operate in the switch-on state.

19. The electronic device according to claim 18, wherein the first switching unit, the second switching unit, and the third switching unit are MOS transistors.

20. The electronic device according to claim 12, wherein the first switching unit and the second switching unit form a Buck circuit.

* * * * *